United States Patent [19]
Colletti

[11] 3,927,576
[45] Dec. 23, 1975

[54] BOOT SEAL FILTER VENT

[75] Inventor: John Benjamin Colletti, Grosse Pointe Park, Mich.

[73] Assignee: TRW Inc., Cleveland, Ohio

[22] Filed: Aug. 1, 1974

[21] Appl. No.: 493,554

[52] U.S. Cl. .................... 74/498; 74/18.2; 74/422; 55/523
[51] Int. Cl.² .................... B62D 3/12; F16J 15/52
[58] Field of Search ........ 74/18.2, 422, 498; 55/523

[56] References Cited
UNITED STATES PATENTS

| | | | |
|---|---|---|---|
| 2,748,750 | 6/1956 | Altschuler | 74/18.2 X |
| 3,022,187 | 2/1962 | Eyraud et al. | 55/523 X |
| 3,124,006 | 3/1964 | Parker | 74/18.2 |
| 3,369,411 | 2/1968 | Hines | 74/18.2 |
| 3,505,898 | 4/1970 | Bradshaw | 74/422 X |
| 3,554,048 | 1/1971 | Adams | 74/422 X |
| 3,753,375 | 8/1973 | Colletti | 74/422 X |

FOREIGN PATENTS OR APPLICATIONS

| | | | |
|---|---|---|---|
| 756,336 | 9/1956 | United Kingdom | 55/523 |

Primary Examiner—Allan D. Herrmann
Attorney, Agent, or Firm—Hill, Gross, Simpson, Van Santen, Steadman, Chiara & Simpson

[57] ABSTRACT

A boot sealed expansible and contractible chamber is vented through a porous sintered powdered metal pellet allowing escape of air while trapping fluids such as oil or grease when the chamber is contracted and allowing ingress of air while trapping contaminants when the chamber is expanded. The trapped lubricant is flushed from the pellet during the inflow of air on expansion of the chamber while the trapped contaminants are flushed from the pellet by the outflow of air when the chamber is contracted. The pellet can be mounted directly in a passageway in the boot or mounted in a passageway of a member on which the boot is mounted. The preferred boot is an elastomeric material sleeve with axially open ends adapted to be respectively clamped on the rack tube and tie rod of a rack and pinion steering assembly and having corrugations or accordion folds between these ends to accommodate flexing and axial elongation and contraction and having a vent passage in one end housing the filter pellet.

7 Claims, 6 Drawing Figures

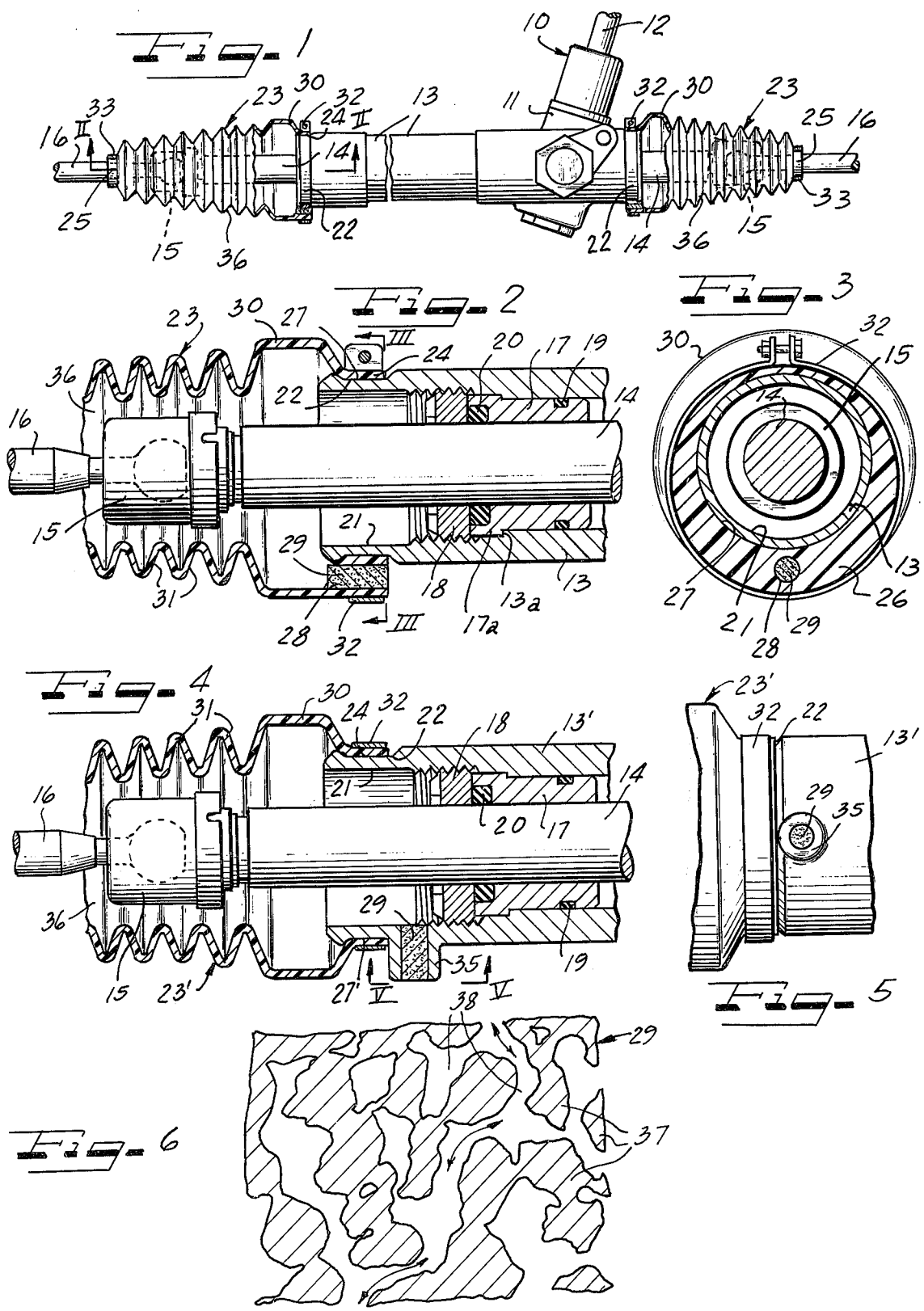

BOOT SEAL FILTER VENT

BACKGROUND OF THE INVENTION

1. Field of the Invention

This invention relates to the art of boot seales and particularly to the venting of boot sealed chambers on the ends of the rack tube of a rack and pinion steering gear to accommodate air flow into and out of the chambers as they are expanded and contracted during reciprocation of the rack bar of the assembly without, however, permitting loss of the lubrication or ingress of dirt into the sealed chambers.

While the inventionn will hereinafter be specifically described as embodied in boot seals for automotive rack and pinion steering gear, it will be understood that the scope of the invention is not limited to such usage anad embraces the filter venting of boot sealed chambers in other installations.

2. Prior Art

Heretofore boot sealed chambers at the ends of the rack tube of a rack and pinion steering gear were intercommunicated by a transfer tube as in the Richard Cass U.S. Pat. No. 3,762,742 issued Oct. 2, 1973. This transfer tube balanced the pressures in the boot seals flowing air from a contracting seal to an elongating seal as the rack bar in the tube was reciprocated to move into one end of the tube and out of the other end of the tube, and vice versa, during steering operations.

SUMMARY OF THIS INVENTION

The present invention now eliminates the necessity for transfer tubes and the like passageways between opposed boot sealed chambers and provides for the expansion and contraction of these chambers without any appreciable variation in pressure in the chambers and without loss of sealing efficiency.

According to this invention a boot sealed chamber is vented to the atmosphere through a porous sintered powdered metal pellet or plug seated in a passageway communicated at one end with the interior of the chamber and at the other end without the atmosphere. No intercommunication of opposed boot sealed chambers is needed and the invention is thus useful in installations having only a single boot sealed chamber. The porosity of the pellets or plugs and the length of air travel therethrough is such that lubricant cannot flow througn the pellet as the bellows chamber is contracted and airborne contaminants such as dirt cannot flow through the pellet as the boot chamber is expanded.

The filter pellets or plugs are self-cleaning since oil trapped in the inner end of the pellet during an outflow of air from the boot chamber will be flushed or purged out of the pellet back into the boot chamber by the inflow of air on the succeeding expansion of the boot chamber. Conversely, dirt trapped in the outer end of the pellet on the air inflow cycle will be flushed or purged from the pellet on the succeeding air outflow cycle.

The boot seal is a sleeve of elastomeric material with axial open ends and cylindrical end portions adapted to receive clamps therearound to contract the open ends on the parts to be sealed. A plurality of accordion folds along the length of the sleeve accommodate axial expansion and contraction from the free state length of the sleeve and also accommodate transverse flexing so that one end of the sleeve may articulate relative to the other end. One end of the sleeve is of larger diameter than the other to fit around a housing such as the end of a rack tube in a rack and pinion steering gear while the other end of the sleeve has a small diameter to fit snugly over and be clamped to a rod such as the shank of a ball stud of the joint carried on the end of a rack bar projecting from the end of the rack tube. The large end of the sleeve preferably has a radially thickened portion with a through hole receiving the filter pellet but alternately the end of the rack tube may have a hollow nipple adjacent the large end of the boot receiving the filter pellet. The accordion folds decrease in diameter from the large to the small ends of the boot and the cylindrical portion at the large end of the boot may have an adjacent larger diameter cylindrical portion extending axially to the first accordion fold.

The filter pellet is preferably composed of powdered metal such as bronze powder of a particulate size to maintain open pores between the particles. The bronze powder is compacted at high pressures to the desired shape and density and is then heated to sinter the particles together without, however, closing the pores. A preferred pellet will have a pore volume and a density such as to exclude liquids, such as oil and water, and admit free flow of air.

It is then an object of this invention to vent boot sealed chambers with porous powdered metal pellets.

A further object of this invention is to provide a boot seal composed of a sleeve of elastomeric material with corrugations along the length thereof accommodating elongation and contraction of the free state length of the sleeve with clamp receiving end portions on the sleeve and a through passage in one end portion snugly mounting a sintered powdered metal porous filter pellet.

Another object of the invention is to provide boot seals adapted for rack and pinion steering gear with porous sintered powder metal filter pellets accommodating breathing of the boot sealed chambers while retaining lubricant therein and preventing ingress of dirt.

A specific object of the invention is to provide a boot seal of elastomeric material having a small diameter axial opan end and a large diameter opposite axially open end with cylindrical clamp receiving portions adjacent said open ends and a hole in one open end carrying a porous filter pellet to accommodate breathing of the boot sealed chamber.

Another object of the invention is to provide a rack and pinion steering gear with elastomeric accordion pleated boots clamped to opposite ends of the rack tube and to rack bar mounted tie rods with hollow nipples depending from the ends of the rack tube and filled with porous metal pellets to accommodate breathing of the boot sealed chambers while preventing ingress of dirt and egress of lubricant.

Other and further objects of this invention will become apparent to those skilled in this art from the following detailed description of the annexed sheet of drawings which by way of preferred examples, illustrate two embodiments of the invention. In the drawings:

FIG. 1 is a fragmentary plan view, with parts in section, of a rack and pinion steering gear equipped with boot seals according to this invention;

FIG. 2 is an enlarged fragmentary sectional view along the line II—II of FIG. 1;

FIG. 3 is a transverse sectional view along the line III—III of FIG. 2;

FIG. 4 is a view similar to FIG. 2 but illustrating a modified embodiment of the invention;

FIG. 5 is a fragmentary plan view along the line V—V of FIG. 4; and

FIG. 6 is an enlarged diagrammatic illustration of a section of a filter pellet according to this invention.

DESCRIPTION OF THE PREFERRED EMBODIMENTS

The rack and pinion steering gear 10 of FIG. 1 includes a pinion housing 11 receiving a steering shaft 12 and mounted on and forming a part of a rack tube 13. A rack bar 14 is slidably mounted in the tube assembly 13 and is reciprocated by a pinion (not shown) in the housing driven by the steering shaft 12. The rack bar 14 projects from both ends of the tube assembly 13 and has ball joint housings 15 on the ends thereof pivotally supporting ball studs 16 which in turn are connected through ball and socket joints to the steering arms of the dirigible wheels of a vehicle (not shown). The rack tube 13 may house a piston (not shown) secured on the rack bar 14 and reciprocated by pumped power steering fluid to provide a power assist for the reciprocation of the rack bar. In such power steering rack and pinion assemblies, the tube and rack bar must be sealed on opposite sides of the piston to provide a leakproof chamber for the power steering fluid. For this purpose a bearing sleeve 17 for the rack bar is mounted in the illustrated end of the tube 13. The bearing has an enlarged end 17a bottomed against a shoulder 13a in the tube 13 and held thereagainst by a threaded plug 18 threaded into the end of the tube 13. A seal 19 is provided in a groove of the bearing 17 to sealingly engage the tube 13 while a seal 20 is seated in a groove in the end of the bearing 17 to sealingly engage the bearing 17, the plug 18, and the rack bar 14. As shown, the plug 18 is inwardly from the end of th tube 13 and the tube thus has an open end recess 21 beyond the plug 18. The portion of the tube 13 around this chamber 21 has an annular groove 22 therearound.

In accordance with this invention, the recesses 21 at the ends of the rack tube 13 and the projecting ends of the rack bar 14 together with the ball joint housings 15 are sealed with boot seals 23 without interfering with the reciprocation of the rack bar or the pivoting of the tie rods. In this manner, the ends of the rack bar and the tie rods are sealed from dirt and may be lubricated.

The boot seals 23 of this invention are sleeves of elastomeric materials such as oil resisting rubber, plastics materials, and the like. The sleeve has axial open ends with a large diameter cylindrical end portion 24 fitting the groove 22 of the rack tube 13 and a small diameter cylindrical opposite end 25 fitting the cylindrical shank of the ball stud 16. The large cylindrical end 24 has a thickened portion 26 provided by a bore 27 which is eccentric to the cylindrical outer peripheral portion of the cylindrical end 24. A through hold 28 extends axially through the thickened portion 26 and is filled with a pellet or plug 29 of porous sintered metal.

A large diameter thin walled cylindrical portion 30 extends radially and axially outwardly from the cylindrical portion 24 and merges into the first of a series of corrugations or accordion pleats or folds 31 along the length of the sleeve. These corrugations decrease in diameter to the small diameter cylindrical end 25 and accommodate elongation or contraction of the sleeve from its free state condition and also accommodate flexing of the end 25 of the sleeve relative to the end 24 as the ball stud 16 pivots.

The end 24 of the sleeve fits snugly in the groove 22 of the rack tube 13 and is clamped tightly therein by a draw clamp 32 encircling the cylindrical end 24. Likewise the cylindrical end 25 snugly embraces the shank portion of the ball stud 16 and is clamped tightly thereagainst by a draw clamp 33 encircled therearound.

In the modification of FIGS. 4 and 5, parts corresponding with parts described in FIGS. 1 to 3 have been marked with the same reference numerals. The rack tube 13' is identical with the tube 13 except that hollow nipples such as 35 depend from the ends of the tube communicating with the recesses 21. These nipples receive the pellets 29 which, in the modification of FIGS. 1 to 3, were inserted in the through holes 28 of the boot seals.

The boot seals 23' of the modification of FIGS. 4 and 5 are the same as the seals 23 but have the large diameter cylindrical end portions 24 provided with concentric holes or apertures 27' which snugly fit the grooves 22.

Thus, in the modification of FIGS. 1 to 3 the boot sealed chambers 36 are vented through the filter pellets 29 carried by the boots themselves while in the modification of FIG. 4, the sealed chambers 36 are vented through the pellets 29 carried by hollow nipples 35 of the rack tube.

As shown in FIG. 6, the pellets 29 are composed of discrete particles 37 of a metal powder and have pores 38 therebetween which are intercommunicated so that air can flow through the pellet. The preferred pellets are composed of bronze powder, compacted and sintered to a density which will accommodate free passage of air or gas but which will trap nongaseous material such as oil or grease and dirt.

OPERATION

As the rack bar 14 is reciprocated, one end thereof will move into the rack tube 13 or 13' while the other end will move outwardly from the rack tube. This, of course, will cause the bellows 23 or 23' on one end of the tube to contract while the bellows on the opposite end of the tube will elongate. This axial contraction and elongation is accommodated by the accordion folds 31 which can separate or fold together. Furhter, as the ball studs 16 articulate relative to the rack bar 14, the ends 25 of the boots will flex relative to the ends 24 and this, too, is accommodated by the accordion folds. As the sealed chamber 36 decreases in volume when the boot 23 or 23' sealing this chamber contracts, air will flow outwardly through the pellet 29 to prevent the boot from blowing up and possibly rupturing. Any lubricant in the chamber 36 will be trapped in the inner end of the pellet 29. Then when the volume of the chamber 36 increases as when the boot sealing this chamber is elongated, air will enter the chamber through the pellet 29 and will flush or purge the grease trapped in the inner end of the pellet. At the same time, the outer end of the pellet will trap any air-laden contaminants such as dirt. The trapped dirt will then be flushed or purged from the outer end of the pellet 29 on the next decrease in volume of the sealed chamber.

It will, therefore, be understood that this invention provides for the breathing of boot sealed chambers as they expand and contract without, however, permitting loss of nongaseous material such as oil or lubricant from the chamber or permitting ingress of contaminants into the chamber.

I claim as my invention:

1. A boot sealed chamber assembly which comprises a housing having an open end, a reciprocating member extending through said open end of the housing, a member pivotally mounted on the end of the reciprocating member, an elastomeric material sleeve having one end sealed around the end of the housing and the other end sealed around the member pivoted on the reciprocating member with accordion folds connecting said ends and accommodating elongation and contraction of the sleeve and flexing of the ends thereof, means providing a passageway venting the interior of the boot sealed chamber to the atmosphere, and a sintred powdered metal porous plug in said passageway with one end portion exposed to the interior of said boot sealed chamber, an opposite end portion exposed to the atmosphere and a peripheral side wall portion covered by the wall of the passageway so as to provide a porous air travel path between said exposed end portions of sufficient length and of sufficient pore size effective to accommodate flow of air through the plug while preventing ingress of contaminants as the sealed chamber increases in volume and loss of lubricants as the chamber decreases in volume and being purged from trapped contaminants or lubricant by the air flow therethrough.

2. The assembly of claim 1 wherein said sleeve has the one end sealed around the end of the housing provided with a cylindrical inner periphery and an eccentric cylindrical outer periphery defining therebetween a thickened portion, said passageway extends axially through said thickened portion, and a contractible clamp is seated around the outer periphery securing said one end of the sleeve to the housing.

3. An articulatable, axially expansible and contractible boot which comprises a sleeve of elastomeric material having axially open ends connected by accordian folds accommodating relative flexing of the ends and elongation and contraction of the free state length of the sleeve, one of said ends having a radially thickened portion, said thickened portion having an elongated passageway therethrough venting the interior of the boot with the atmosphere, an elongated porous pellet of sintered metal tightly fitted in said passageway having a first end face portion exposed to the interior of the boot and a second opposite end face portion exposed to the atmosphere, said elongated pellet having a sufficient length covered by said passageway and a sufficient pore size through said length to provide an air travel path between said exposed end portions effective to accommodate flow of air into and out of the boot, to stop ingress of contaminants into the boot from the atmosphere and to trap lubricant as air is being expelled from the boot without discharge of lubricant to the atmosphere and to purge lubricant trapped in the pellet back into the boot upon flow of air into the boot and to purge contaminants from the pellet upon flow of air to the atmosphere.

4. A steering gear having a tube with a bar projecting from opposite ends thereof, ball joint housings on the ends of said bar, ball studs extending from said housings in tiltable relationship, elastomeric boots having large diameter ends sealed on the ends of the tube and small diameter ends sealed on the ball studs, said boots providing expansible and contractible sealed chambers at the ends of the tube, said tube having nipples on the ends thereof defining elongated passageways venting the sealed boot chambers with the atmosphere, and elongated porous metal filter plugs tightly fitted in said passageways having exposed first end portions communicating with the sealed boot chambers and exposed second end portions communicating with the atmosphere together with elongated intermediate portions between said end portions effective to trap lubricants as air is expelled from the sealed boot chambers during contraction of the boots and for trapping contaminants from the atmosphere as air flows into the sealed boot chambers during expansion of the boots with the trapped lubricants being purged from the plugs during inflow of air into the sealed boot chambers and with contaminants being purged from the plugs upon outflow of air from the sealed boot chambers.

5. The steering gear of claim 4 wherein said bar slides through a seal in one end of the tube and the boot chamber is sealed from the tube beyond said seal.

6. An articulatable, axially exansible and contractible boot which comprises a sleeve of elastomeric material having axially open ends connected by accordion folds accommodating relative flexing of the ends and elongation and contraction of the free state length of the sleeve, one of said ends being or larger diameter than the other of said ends and having a radially thickened portion with an axial hole therethrough providing an elongated axial passageway venting the interior of the boot to the atmosphere, an axially elongated cylindrical porous plug of sintered metal tightly fitted in said passageway and having a first end face portion exposed to the interior of the boot and a second remote end face portion exposed to the atmosphere, and the effective length of said plug between said exposed end face portions together with the size of the pores of the plug being effective to accommodate free flow of air into and out of the boot chamber while trapping lubricant in the first end face portion of the plug during contraction of the boot and trapping contaminants in the second end face of the plug during inflow of air upon expansion of the boot while simultaneously purging trapped lubricant from the first end face portion of the boot during inflow of air into the boot, and purging trapped contaminants from the second end face portion of the plug during outflow of air from the boot, and a contractible clamp around said large end portion of the boot for tightening said end portion of the boot around an inserted member without collapsing said axial passageway.

7. The boot of claim 6 wherein the larger diameter end of the sleeve is connected to the adjacent accordion fold by a thin wall cylindrical portion of larger diameter than said end and said fold.

* * * * *